UNITED STATES PATENT OFFICE.

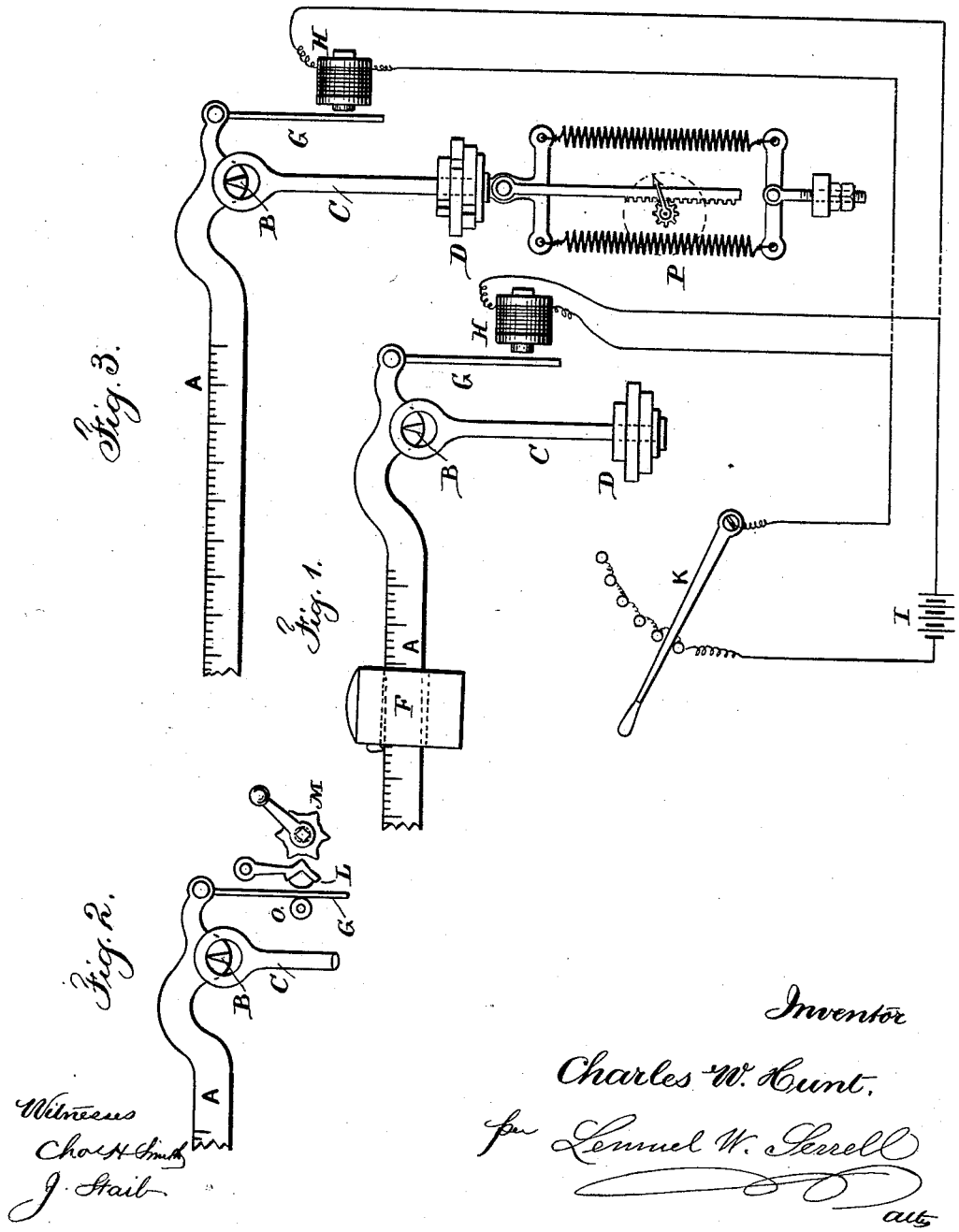

CHARLES W. HUNT, OF WEST NEW BRIGHTON, NEW YORK.

WEIGHING APPARATUS.

SPECIFICATION forming part of Letters Patent No. 468,108, dated February 2, 1892.

Application filed February 2, 1891. Serial No. 379,915. (No model.)

*To all whom it may concern:*

Be it known that I, CHARLES W. HUNT, a citizen of the United States, residing at West New Brighton, in the county of Richmond and State of New York, have invented an Improvement in Weighing Mechanism, of which the following is a specification.

Difficulty has heretofore been experienced in weighing with rapidity, especially with heavy bodies, because the inertia of the weighing apparatus causes the scale-beam to pass beyond the point of equilibrium and to return, and this produces a vibration, and considerable time is lost before the vibration ceases, and this difficulty is augmented in cases were the article to be weighed is in motion—such, for instance, as coal-cars traveling in succession over a platform-scale or barrels or similar articles rolling over a scale.

The present invention is made for arresting the inertia of the scale mechanism, in order that the index or pointer denoting the weight may be brought to a standstill almost instantly and that without interfering in any manner with the accuracy of the weighing device.

My invention consists in the combination, with the weighing device, of a clamping device which acts to check the movement of the weighing mechanism progressively, so that such weighing mechanism, instead of having the usual latitude of vibration, is partially or entirely stopped successively during the range of the movement, so that by the time the parts come to the position of equipoise there is little or no motion of the indicating mechanism resulting from inertia. Hence the indicating-hand or similar device will move over the dial to a figure indicating the weight and will not pass beyond that point, or so imperceptibly that the accurate weight will be instantly denoted, and this invention is applicable to scales of all characters; but it is especially useful in weighing coal-cars as they are moved progressively over a platform-scale, and it is also equally available in the weighing of barrels containing petroleum or other material that may be rolled along over a scale; and by my improvements the attendant only has to note down the figure or figures to which the hand moves, and the weight is thereby rapidly and more accurately indicated than in the devices that have heretofore been employed.

In the drawings, Figure 1 represents a portion of the scale-beam with my improvements applied thereto. Fig. 2 is a diagrammatic representation of a modification in the clamping device, and Fig. 3 shows the invention as applied to a beam having a spring and index-hand.

To obtain an accuracy of indication in the weighing device the scale must be accurately balanced and the weight indicated by proper graduations and figures. These vary according to the character of the scale, and the diagrammatic views upon the drawings are only illustrative of the mode of applying the present improvements.

Let A represent a scale-beam similar to that employed in a platform-scale; B, the knife edge; C, the suspending-link resting thereon; D, the changeable weights, and F a movable weight, and under ordinary circumstances the outer end of the beam A from which the weights D are suspended rises and falls according to the position of the adjustable weight F, and the inertia of the parts causes this beam A to rise and fall a distance limited by the loop or hanging bracket through which such beam passes, and by the adjustment of the weight F the beam is brought to an equipoise.

To check the vibrations of the beam, I make use of a progressively-acting clamping and releasing device acting upon the beam or upon a plate G, connected to the beam. I have shown such a plate in Fig. 1 as hanging close to an electro-magnet H, the circuit to which from the battery I is opened and closed with rapidity by any suitable circuit-breaker. I have represented a lever K, that may be moved by hand or power over a series of contact-points to close the circuit momentarily at each contact and bring the electro-magnet into action to hold the armature-plate G against its pole and then release the same. This checks the inertia in the movement of the scale-beam and allows such scale-beam to move gradually to the point of equipoise, or this same effect may be produced mechanically, such as by the clamp L brought into contact with the hanging plate G by a wheel M, having a series of cam-points acting against the pendent clamp N, there being a roller or a friction post or bearing O at the opposite side of the plate G, as indicated in Fig. 2, and it is to be understood that the article to be weighed may be rolled or moved upon and over the scale while being weighed. The scale is allowed to move by the load, and the weight F is adjusted until the scale comes to an equipoise, and the weight is thereby accurately indicated. Care, of course, must be taken that the clamp is not in action at the time the weight is finally determined.

In weighing coal, barrels, and similar articles the difference between one weight and another is comparatively small. For this reason the weights D may be used to counterpoise a minimum load, preferably, of hundreds or thousands of pounds, and a spring-steelyard P, Fig. 3, may be added capable of weighing between the minimum and maximum loads. Hence the attendant only has to write down the indications by the hand of the spring-steelyard P, the range of the steelyard being sufficient to compass the difference between the weight of one article and another, and the minimum load by the weights D being added to the weight denoted by the hand of the spring-scale. These weights D may be changed or varied according to the minimum weight without changing the action of the steelyard P.

I do not limit myself to any particular clamping device for arresting the motion, as the same may be either mechanical or electrical.

I claim as my invention—

1. The combination, with a scale-beam, of a plate and a clamping mechanism acting upon the plate to clamp and release the same and allow the gradual movement of the scale-beam, substantially as set forth.

2. The combination, with a scale-beam in a weighing apparatus, of a pendent plate connected to and moving with the scale-beam, a circuit closing and breaking mechanism, and an electro-magnet acting on the pendent plate to check the inertia and progressively stop the oscillations of the scale, substantially as set forth.

3. The combination, with a scale-beam and movable weights, of a spring connected to the scale-beam, an indicator to denote the difference in the weights of articles on the scale, and a clamping and releasing device, substantially as set forth.

4. The combination, with the scale-beam and a spring and index for indicating the weight upon the scale, of an electro-magnet and circuit breaking and closing device for progressively clamping or holding the weighing mechanism as it moves under the action of the weight, substantially as set forth.

Signed by me this 26th day of January, 1891.

CHAS. W. HUNT.

Witnesses:
   GEO. T. PINCKNEY,
   HAROLD SERRELL.